G. M. JOHNSON.
SAFETY DEVICE FOR MINE CAGES.
APPLICATION FILED FEB. 24, 1921.

1,425,203.

Patented Aug. 8, 1922.
2 SHEETS—SHEET 2.

WITNESS

INVENTOR
George M. Johnson

UNITED STATES PATENT OFFICE.

GEORGE M. JOHNSON, OF JEANNETTE, PENNSYLVANIA.

SAFETY DEVICE FOR MINE CAGES.

1,425,203.     Specification of Letters Patent.     Patented Aug. 8, 1922.

Application filed February 24, 1921. Serial No. 447,593.

*To all whom it may concern:*

Be it known that I, GEORGE M. JOHNSON, a citizen of the United States, residing at Jeannette, in the county of Westmoreland and State of Pennsylvania, have invented certain new and useful Improvements in Saftey Devices for Mine Cages, of which the following is a specification.

This invention relates to safety devices for mine cages, although it is to be understood that the device can be employed for any purposes or in connection with any form of lift or elevator wherein it is found applicable, and the invention has for its object to provide, in a manner as hereinafter set forth, a safety device, of the catching or gripping type, with means automatically operated, when the elevating cable for the cage breaks or becomes slack, to grip the guide rails of the shaft to arrest descent or movement of the cage, to prevent the latter dropping or falling to the bottom of the shaft, thereby preventing injury to anyone on the cage or to the equipment.

A further object of the invention is to provide a safety device for the purpose referred to, and in a manner as hereinafter set forth, whereby the operating elements of the device, are positioned within an enclosing casing to protect the said elements from dirt, snow, sleet or other substances which would retard or interfere with the operation of said elements when these latter are released to cause gripping of the guide rails of the shaft.

A further object of the invention is to provide a safety device for the purpose set forth, and in a manner as hereinafter referred to, with gripping elements having teeth so disposed to enable same to quickly and securely engage with the guide rails of the shaft to cause stoppage of the descending movement of the cage.

Further objects of the invention are to provide a safety device for the purpose set forth, which is simple in its construction and arrangement, automatic in its action, strong, durable, efficient in its use, readily set up with respect to the cage and elevating cable, and comparatively inexpensive.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
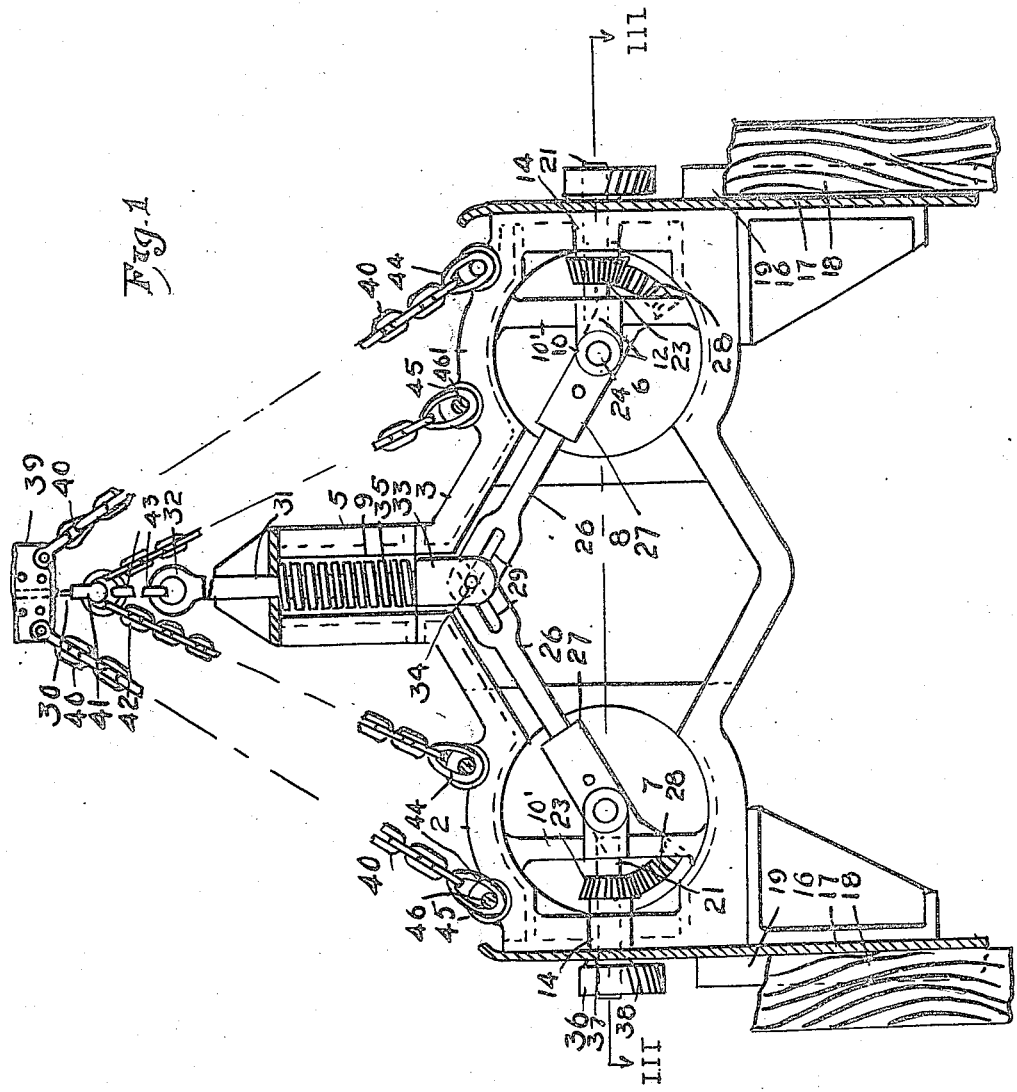
Figure 1, is a sectional elevation of the safety device for mine cages in accordance with this invention.
Figure 2:
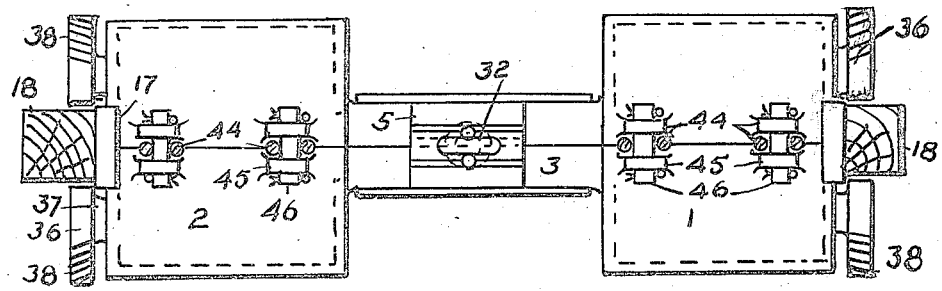
Figure 2, is a top plan view.
Figure 3:
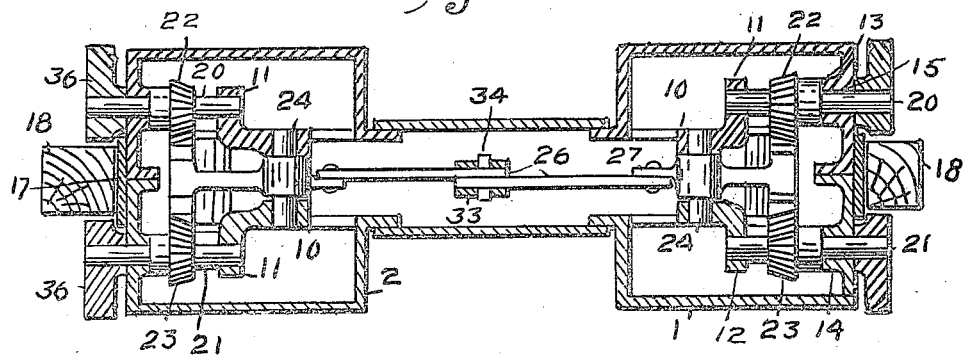
Figure 3, is a section on line III—III Figure 1, the levers being shown in full lines.
Figures 4, 5:
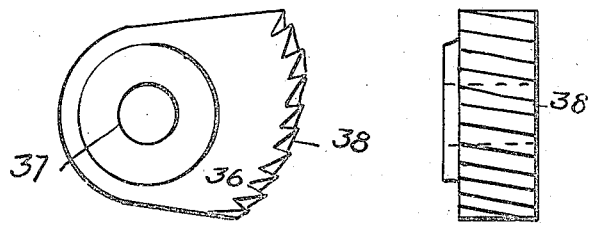
Figure 4, is a side view, Figure 5, an edge view
Figure 6:
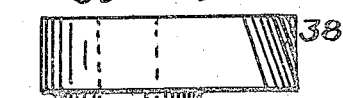
Figure 6 is a top plan of one of the gripping elements.

Referring to the drawings in detail the device comprises an enclosing casing formed of a pair of end portions 1, 2, an intermediate portion 3 formed with an upwardly extending portion 5. The end portions 1, 2 provide chambers 6, 7, respectively and the portions 3, 5 form the chambers 8, 9 respectively. The chambers 6, 7 open into the chamber 8, and the chamber 9 opens into the chamber 8. Within each of the chambers 6, 7 is arranged a supporting web 10', provided with the bearings 10, 11 and 12, and alining with the bearings 11 and 12, are the bearings 13, 14, formed on the outer end wall of the chamber and which has openings 15 registering with the bearings 13, 14.

The enclosing casing is mounted on the supports 16, which are secured with the top of the mine cage, not shown, and abutting against the ends of the enclosing casing and the supports 16, are the wearing plates or strips 17, which oppose the guide rails 18, within the shaft, not shown. The guide rails 18 are of wood, and the plates or strips 17 are flanged, as at 19, below the enclosing casing.

Mounted in a bearing 11 and the bearing 13 which alines therewith, is a gripping element shaft 20, and mounted in a bearing 12 and in the bearing 14 which alines therewith is a gripping element shaft 21. The shafts 20, 21, project outwardly from the ends of the enclosing casing and through the openings 15 and extend to the sides of the guide rails 18. Carried by the shaft 20, is a bevelled pinion 22, and mounted on the shaft 21, is a bevelled pinion 23. The pinions 22, 23 are spaced from each other.

The bearing 10, is arranged rearwardly of the bearings 11, 12, and extends at right angles with respect to said bearings, as well as being positioned in a path which extends between the bearings 11, 12. The bearing 10, is disposed transversely with respect to the end portion of the enclosing casing, while the bearings 11, 12, are disposed horizontally of said end portion. The bearing 10, is formed of two spaced sections and mounted in the said sections is a short shaft 24.

Carried by the shaft 24, is the hub 25 of an operating lever. Two operating levers are employed and they extend in opposite directions relative to each other, and each lever is formed of an inner section 26, and an outer section 27, which are suitably connected together. The hub 25 is formed integral with the outer section 27, at a point removed from the outer end of said section 27, whereby the outer portion of the section 27, will extend between the rear ends of the shafts 20 and 21. The outer portion of the section 27 terminates in a double toothed quadrant 28, having one set of teeth meshing with the pinion 22, and the other set of teeth meshing with the pinion 23, so that when the section 27, is rocked, in a manner as hereinafter referred to the shafts 20 and 21 will be actuated in one direction to swing the gripping elements, carried by said shafts, into engagement with the guide rails 18, and when actuated in the other direction the gripping elements will be moved clear or released from engagement with the said guide rails. The construction of the gripping elements will be hereinafter referred to.

The sections 26, overlap at the inner portions and each of the inner portions of the sections 26, is formed with an elongated longitudinally extending slot 29. The slots 29 oppose each other.

The quadrants 28 are arranged in the chambers 6, 7, the section 26 in the chambers 6, 7 and the sections 26 in the chamber 8, whereby these elements are protected against foreign substances.

Extending down through the portion 5, of the enclosing casing, that is through the chamber 9 and into the chamber 8, is a spring controlled, as well as being controlled by the elevating cable 30, for the cage, hanger member consisting of an elongated shank 31, having its upper end provided with an eye 32, and its lower end with an inverted yoke 33, which straddles the inner ends of the sections 26. The yoke carries a pin 34, which extends through the slots 29, whereby a slidable connection is set up between the inner ends of the sections 26 and the hanger element. Arranged in the chamber 9, as well as surrounding the shank 31, is a coiled spring 35, which when released will depress the hanger element whereby the inner ends of the sections 26, will be moved downwardly causing the quadrants 28 to actuate the gripping element shafts to move the gripping elements to engage the guide rails to arrest descent of the cage. The spring 35 is interposed between the yoke 33 and the top of the chamber 9, and under normal conditions is maintained under a state of compression by the elevating cable 30, but if the latter breaks or becomes slack the spring 35 will expand and cause actuation of the operating levers, these also have a tendency for their inner ends to move downwardly when such ends are released due to the breakage of the cable 30, or slack in the cable.

Each of the gripping elements comprises a quadrant shaped body 36, provided with a hub 37, which is mounted on the outer end of the gripper element shaft. The body 36 has a gripping face provided with teeth 38 which are disposed diagonally with respect to the edge of the body 36. The diagonal disposition of the teeth 38 provides for the dislodgment of corrosion or other foreign matter therefrom by gravity, and augment the utility of the device by tending to draw the guide rails 18 against the plate 17 to frictionally engage each other. The working face of said element is eccentrically disposed with respect to the axis of the shaft on which it is mounted, whereby the gripping action will gradually increase between the gripping elements and the guide rails during the operation of the gripping elements thereby insuring a secure grip.

The cable 30 carries a coupling member 39, to which a pair of securing cables 40 are connected. The lower end of the cable 30 is provided with a clevis 41, to which is attached a pair of securing cables 42, arranged inwardly with respect to the cables 40. Attached to the clevis 41 is a connecting cable 43, which is secured to the eye 32 of the hanger element. Each of the securing cables is in the form of a chain and the lower link 44 thereof is positioned between a pair of lugs 45 which are integral with the top of the enclosing casing. A pin 46 extends through each pair of lugs and the link 44, whereby the securing cables are secured to the top of the enclosing casing.

What I claim is:—

1. A safety device for the purpose set forth comprising two pair of gripping elements, actuating means therefor, a pair of oppositely disposed operating levers having direct toothed engagement with said actuating means and normally maintained in inoperative position, and means whereby said levers are released from inoperative position and shifted to directly operate said actuating means.

2. A safety device for the purpose set forth comprising two pair of gripping elements, an actuating means for each pair of gripping elements, a pair of operating levers each having direct toothed engagement with an actuating means and normally maintained in operative position, and a spring controlled hanger element connected with said elements and adapted to be secured to an elevating cable.

3. A safety device for the purpose set forth comprising two pair of gripper element shafts, a gripper element secured to the outer end of each shaft, a double toothed quadrant operatively engaging with a pair of shafts to actuate them, a pair of operating levers carrying and shifting the quadrants to operate the shafts, and a spring controlled element for rocking said levers.

4. A safety device for the purpose set forth comprising two pair of gripper element shafts, a gripper element on the outer end of each shaft, a pair of operating levers each having direct toothed engagement with a pair of shafts for actuating them to shift said elements, a spring controlled hanger element connected to the inner ends of said levers, and an enclosing casing for said shafts, levers and hanger element, said gripper elements arranged exterior of said casing.

5. A safety device for the purpose set forth comprising a spring controlled hanger element normally maintained in an elevated position by an elevating cable and automatically lowered when the cable becomes slack or breaks, a pair of oppositely disposed operating levers having their inner ends connected with said element, gripper elements, and actuating means for said gripper elements, said actuating means having direct toothed engagement with said levers and operated to shift the gripper elements from the levers when these latter are shifted by the vertical movement of said hanger element.

6. A safety device for the purpose set forth comprising a spring controlled hanger element normally maintained in an elevated position by an elevating cable and automatically lowered when the cable becomes slack or breaks, a pair of oppositely disposed operating levers having their inner ends connected with said element, gripper elements, and actuating means for said gripper elements, said actuating means having direct toothed engagement with said levers and capable of being operated to shift the gripper elements when the levers are shifted by the vertical movement of said hanger element, and an enclosing casing for said hanger element, said actuating means and said levers.

7. A safety device for the purpose set forth comprising two pair of toothed gripping elements, an actuating means for each pair of said elements, a doubled toothed quadrant directly engaging with an operating and actuating means, a lever carrying each quadrant and adapted when rocked to shift the quadrant therewith, and a spring controlled element connected with said levers and adapted when shifted to rock the levers.

8. A safety device for the purpose set forth comprising two pair of toothed gripping elements, shafts therefor, and operating means for the shafts including a pair of rocking levers having their outer ends in direct toothed engagement with the shafts, and an enclosing casing for said shafts and operating means.

9. A safety device for the purpose set forth comprising an enclosing casing adapted to be secured with the top of a vertically movable carrier and including a reduced intermediate portion and a pair of enlarged end portions, each of said end portions having its top provided with two pairs of lugs, a vertically movable and spring controlled hanger element within said intermediate portion, gripper elements-operating means within the end portions and connected with said hanger element, an elevating cable attached to said hanger element, a plurality of securing cables at each side of and attached at their upper ends to said elevating cable and at their lower ends extended between two pairs of said lugs, and pins extending through the lugs for connecting the securing cables therewith.

In testimony whereof I affix my signature.

GEORGE M. JOHNSON.